United States Patent [19]

Yamadate et al.

[11] Patent Number: 5,253,356
[45] Date of Patent: Oct. 12, 1993

[54] DIRECT MEMORY ACCESS (DMA) REQUEST CONTROLLING ARRANGEMENT INCLUDING SAMPLE AND HOLD CIRCUITS AND CAPABLE OF HANDLING IMMEDIATELY SUCCESSIVE DMA REQUESTS

[75] Inventors: Makoto Yamadate; Yoshihito Takahashi, both of Tokyo, Japan

[73] Assignee: NEC Corporation, Tokyo, Japan

[21] Appl. No.: 647,100

[22] Filed: Jan. 29, 1991

[30] Foreign Application Priority Data

Jan. 29, 1990 [JP] Japan .................................. 2-19793

[51] Int. Cl.⁵ .................... G06F 13/28; G06F 13/42
[52] U.S. Cl. ................................. 395/425; 395/550; 364/240.9; 364/242.3; 364/242.31; 364/271; 364/DIG. 1
[58] Field of Search .............................. 395/425, 550; 364/200 MS File

[56] References Cited

U.S. PATENT DOCUMENTS

| | | | |
|---|---|---|---|
| 4,414,664 | 11/1983 | Greenwood | 395/725 |
| 4,417,304 | 11/1983 | Dinwiddie, Jr. | 395/425 |
| 4,428,044 | 1/1984 | Liron | 395/275 |
| 4,558,412 | 12/1985 | Inoshita et al. | 395/325 |
| 4,611,279 | 9/1986 | Andresen et al. | 395/425 |
| 4,811,204 | 3/1989 | Fung | 395/275 |

OTHER PUBLICATIONS

"8237A High Performance Programmable DMA Controller", Microprocessor and Peripheral Handbook, vol. 1—Microprocessor, Intel manual (Oct., 1987), pp. 2-222 to 2-240.

Primary Examiner—Glenn Gossage
Attorney, Agent, or Firm—Sughrue, Mion, Zinn, Macpeak & Seas

[57] ABSTRACT

A direct memory access (DMA) request control arrangement controls a DMA request signal produced by a peripheral device and produces a DMA acknowledgement signal to deliver the acknowledgement signal to the peripheral device. The DMA request control arrangement includes a first sample-and-hold circuit which samples the request signal into a first sampled signal in synchronism with clock pulses and holds the first sampled signal as a first held signal. A second sample-and-hold circuit samples the first held signal into a second sampled signal in synchronism with the clock pulses and holds the second sampled signal as the DMA acknowledgement signal. A detecting circuit detects a time instant at which the request signal changes to a nonrequest level after the acknowledgement signal has reached an acknowledged level and thereby produces a detection signal. An end signal producer produces an end signal representative of an end of direct transfer between the peripheral device and a memory in response to one of the clock pulses that is generated immediately after reception of the detection signal. The second sample-and-hold circuit makes the acknowledgement signal have a nonacknowledged level in response to a different one of the clock pulses that is generated immediately after reception of the end signal.

1 Claim, 5 Drawing Sheets

DIRECT MEMORY ACCESS (DMA) REQUEST CONTROLLING ARRANGEMENT INCLUDING SAMPLE AND HOLD CIRCUITS AND CAPABLE OF HANDLING IMMEDIATELY SUCCESSIVE DMA REQUESTS

BACKGROUND OF THE INVENTION

This invention relates to a DMA (direct memory access) request controlling arrangement for use in a DMA controller.

As is known in the art, a DMA controller controls direct transfer of data between a peripheral device and a memory in synchronism with a sequence of clock pulses of a common clock pulse period. The peripheral device comprises a DMA request signal producer for producing a DMA request signal. The DMA request signal has request and nonrequest levels which represent generation and nongeneration of a DMA request, respectively. Such a DMA controller is disclosed in, for example, Microprocessor and Peripheral Handbook, Volume I-Microprocessor, Intel manual (INTEL Corp., Santa Clara, Calif.), pages 2-222 to 2-240 (October, 1987), under the heading of "8237A HIGH PERFORMANCE PROGRAMMABLE DMA CONTROLLER".

The DMA request controlling arrangement controls the DMA request signal to produce a DMA acknowledgement signal and to deliver the DMA acknowledgement signal to the peripheral device. The DMA acknowledgement signal has acknowledged and nonacknowledged levels which represent generation and nongeneration of a DMA acknowledgement signal for the DMA request, respectively. The DMA acknowledgement signal of the acknowledged level initiates the transfer of data between the peripheral device and the memory. In order for the peripheral device to start the direct transfer of data, the DMA request signal must be kept at the request level in the peripheral device until the DMA acknowledgement signal achieves the acknowledged level.

The peripheral device carries out the direct transfer of data in a demand transfer mode. In the demand transfer mode, the peripheral device successively carries out the direct transfer of data to the memory. The peripheral device maintains the DMA request signal continuously at the request level until the direct transfer of data comes to an end. That is, the direct transfer of data comes to an end when the DMA request signal changes to the nonrequest level.

As will later be described, a conventional DMA request controlling arrangement comprises a sample-and-hold circuit. Supplied with the DMA request signal, the sample-and-hold circuit samples the DMA request signal into a sampled signal in synchronism with the sequence of clock pulses and holds the sampled signal as a held signal. Such sampling operation is carried out for the purpose of detecting the request and nonrequest levels of the DMA request signal.

Suppose that the peripheral device changes the DMA request signal for a first DMA request to the nonrequest level immediately after the peripheral device receives the DMA acknowledgement signal of the acknowledged level for the first DMA request in order to carry out the direct transfer of data, and that the peripheral device changes the DMA request signal for a second or different DMA request to the request level immediately after the DMA request signal changes to the nonrequest level for the first DMA request. More specifically, suppose that the peripheral device produces the second DMA request before the sample-and-hold circuit samples the DMA request signal of the nonrequest level for the first DMA request.

In this case, the sample-and-hold circuit determines that the peripheral device continuously produces the first DMA request although the peripheral device actually produces the second DMA request different from the first DMA request. This is because the sample-and-hold circuit samples the DMA request signal of the request level in response to a clock pulse without sampling the DMA request signal of the nonrequest level for the first DMA request. Thus, the conventional DMA request controlling arrangement malfunctions when the second DMA request is generated immediately after the peripheral device receives the DMA acknowledgement for the first DMA request.

SUMMARY OF THE INVENTION

It is therefore an object of this invention to provide a DMA request controlling arrangement which is capable of dealing with a different DMA request generated by a peripheral device immediately after the peripheral device recognizes a DMA acknowledgement for a preceding DMA request.

It is another object of this invention to provide a DMA request controlling arrangement which is capable of rapidly responding to the different DMA requests generated immediately after the peripheral device recognizes the DMA acknowledgement for the preceding DMA request.

Other objects of this invention will become clear as the description proceeds.

A direct memory access request controlling arrangement to which this invention is applicable is used in a direct memory access controller which controls direct transfer of data between a peripheral device and a memory in synchronism with a sequence of clock pulses of a common clock pulse period. The peripheral device comprises a direct memory access request signal producing means for producing a direct memory access request signal which has request and nonrequest levels representing generation and nongeneration of a direct memory access request, respectively. The direct memory access request controlling arrangement controls the direct memory access request signal to produce a direct memory access acknowledgement signal and to deliver the direct memory access acknowledgement signal to the peripheral device. The direct memory access acknowledgement signal has acknowledged and nonacknowledged levels representing generation and nongeneration of a direct memory access acknowledgement for the direct memory access request, respectively.

According to this invention, the direct memory access request controlling arrangement comprises: first sample-and-hold means supplied with the direct memory access request signal and with the sequence of clock pulses for sampling the direct memory access request signal into a first sampled signal in synchronism with the sequence of clock pulses and for holding the first sampled signal as a first held signal; second sample-and-hold means connected to the first sample-and-hold means and supplied with the sequence of clock pulses for sampling the first held signal into a second sampled signal in synchronism with the sequence of clock pulses and for holding the second sampled signal as a second held signal which serves as the direct memory access acknowledgement signal; detecting means connected to the second sample-and-hold means and supplied with the direct memory access request signal for detecting a time instant at which the direct memory access request signal changes to the nonrequest level after the direct memory access acknowledgement signal changes to the acknowledged level, the detecting means thereby producing a detection signal upon detection of the time instant at which the direct memory access request signal changes to a nonrequest level after the DMA acknowledgement signal changes to the acknowledged level; and end signal producing means connected to the detecting means and supplied with the sequence of clock pulses for producing an end signal representative of an end of the direct transfer of data in response to one of the clock pulses that is generated immediately after reception of the detection signal. The second sample-and-hold means is furthermore connected to the end signal producing means to change the direct memory access acknowledgement signal to the nonacknowledged level in response to a different one of the clock pulses that is generated immediately after reception of the end signal.

DESCRIPTION OF THE PREFERRED EMBODIMENT

Figure 1:
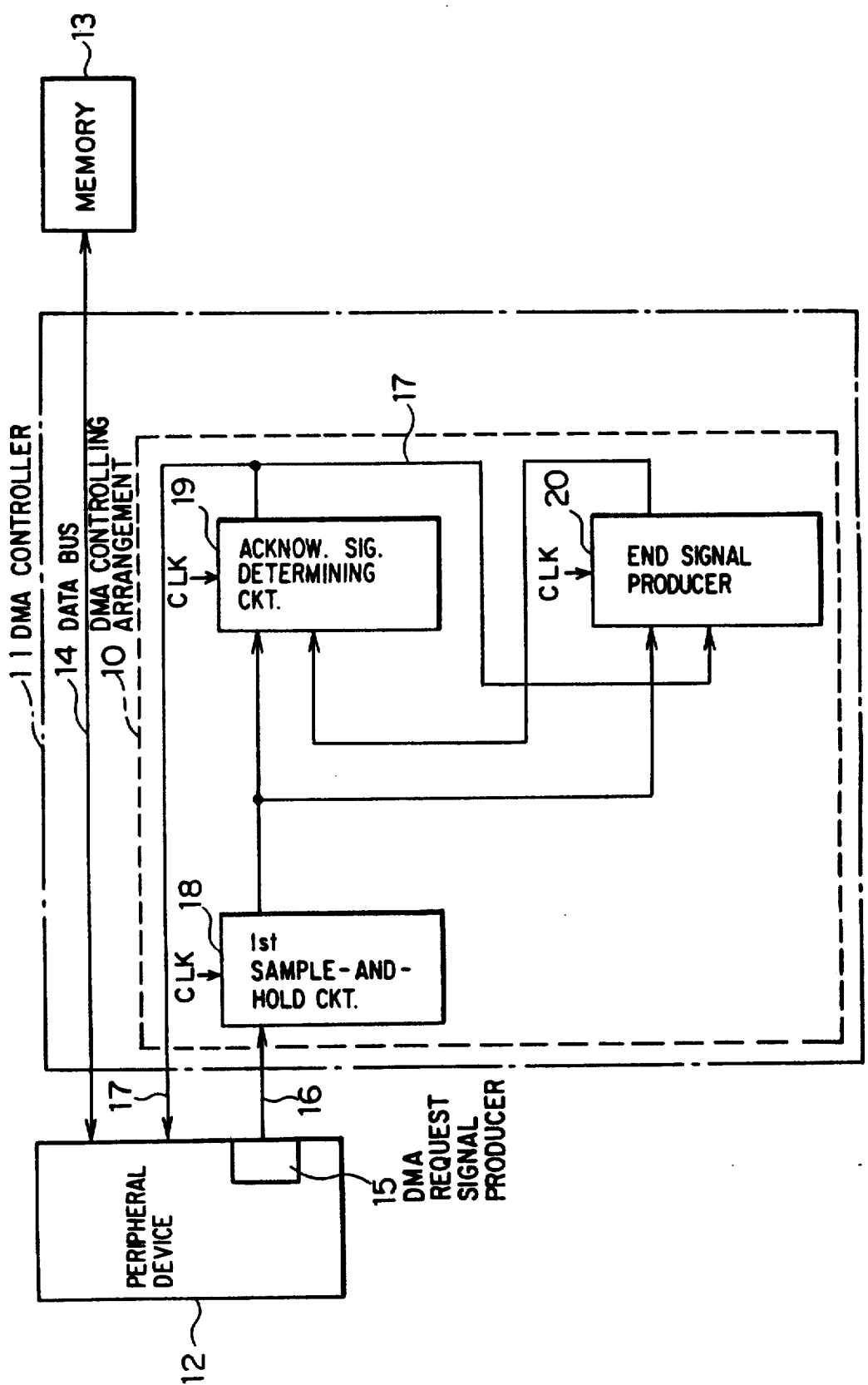
FIG. 1 is a block diagram of a microprocessor system comprising a conventional DMA request controlling arrangement.
Figure 2:
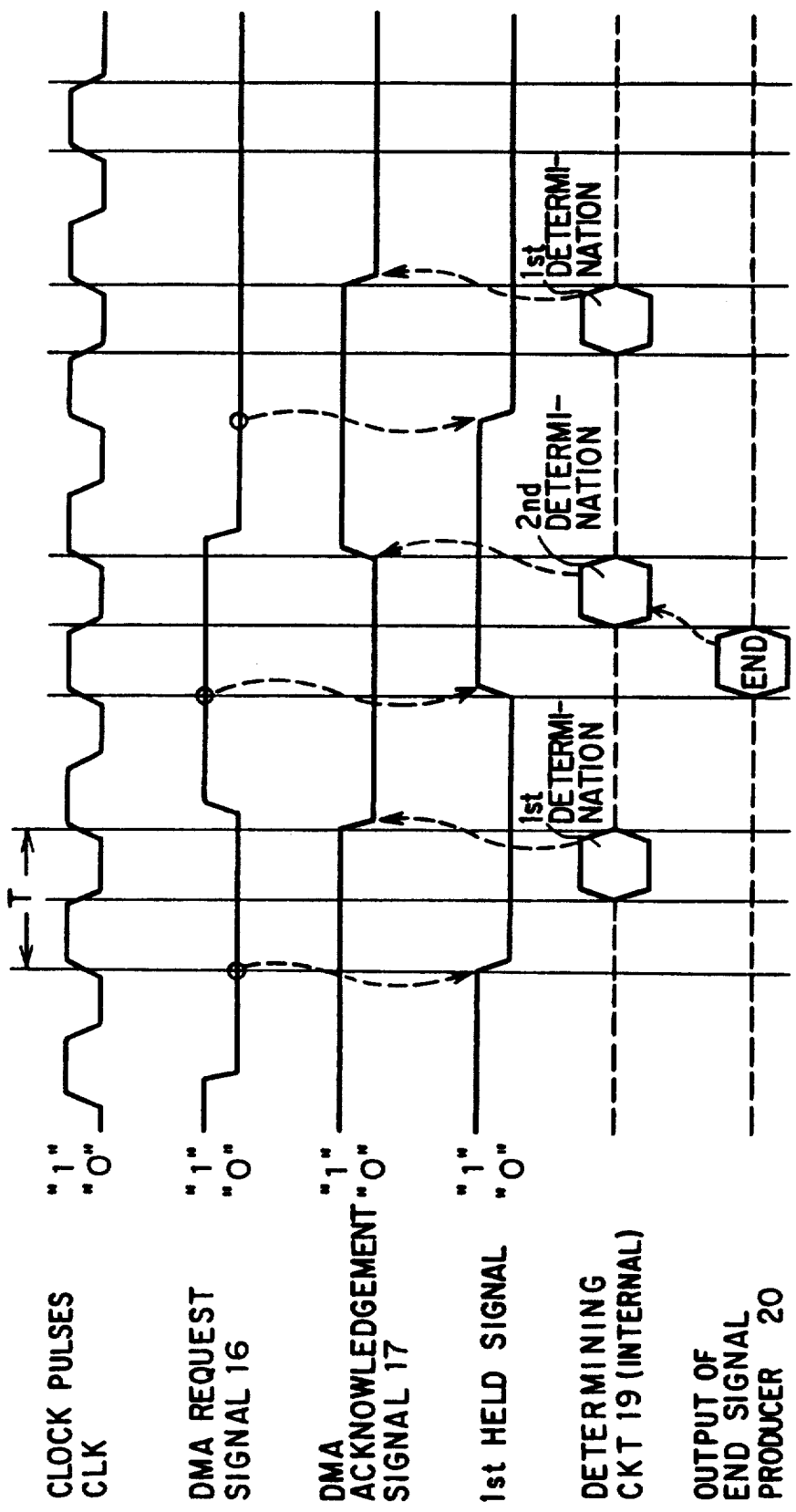
FIG. 2 is a time chart for use in describing operation of the DMA request controlling arrangement illustrated in FIG. 1.

Referring to FIGS. 1 and 2, a conventional DMA (direct memory access) controlling arrangement 10 will be described at first for a better understanding of this invention. The DMA controlling arrangement 10 is equivalent to a conventional DMA controlling arrangement which is described earlier in the instant specification.

In FIG. 1, the DMA controlling arrangement 10 is used in a DMA controller 11 which is a peripheral interface circuit of a microprocessor system comprising a peripheral device 12 and a memory 13. The peripheral device 12 may be a disk unit, a magnetic tape unit, or the like.

The DMA controller 11 controls direct transfer of data between the peripheral device 12 and the memory 13 in synchronism with a sequence of clock pulses. The direct transfer of data is carried out between the peripheral device 12 and the memory 13 by use of a bus 14. The sequence of clock pulses CLK is depicted along a first or top line in FIG. 2 and has a clock pulse period T.

In FIG. 1, the peripheral device 12 comprises a DMA request signal producer 15 for producing a DMA request signal 16. The DMA request signal 16 is depicted along a second line in FIG. 2 and has request and nonrequest levels which represent generation and nongeneration of a DMA request, respectively. In FIG. 2, the request level and the nonrequest level correspond to a logic "0" level and a logic "1" level, respectively.

In FIG. 1, the DMA request controlling arrangement 10 controls the DMA request signal 16 to produce a DMA acknowledgement signal 17 and to deliver the DMA acknowledgement signal 17 to the peripheral device 12. The DMA acknowledgement signal 17 is depicted along a third line in FIG. 2 and has acknowledged and nonacknowledged levels which represent generation and nongeneration of a DMA acknowledgement for the DMA request, respectively. In FIG. 2, the acknowledged level and the nonacknowledged level correspond to a logic "0" level and a logic "1" level, respectively.

In FIG. 1, the DMA acknowledgement signal 17 of the acknowledged level initiates the direct transfer of data between the peripheral device 12 and the memory 13 through the bus 14. In order for the peripheral device 12 to start the direct transfer of data, the DMA request signal 16 has to be kept at the request level in the peripheral device 12 until the DMA acknowledgement signal 17 changes to the acknowledged level.

More specifically, when the peripheral device 12 successively carries out the direct transfer of data in a demand transfer mode described earlier in the instant specification, the peripheral device 12 maintains the DMA request signal 16 continuously at the request level until the direct transfer of data comes to an end.

In FIG. 1, the DMA controlling arrangement 10 comprises a first sample-and-hold circuit 18. Supplied with the DMA request signal 16, the first sample-and-hold circuit 18 samples the DMA request signal 16 into a first sampled signal in synchronism with leading edges of the clock pulses CLK and holds the first sampled signal as a first held signal. The held signal is depicted along a fourth line in FIG. 2.

In FIG. 1, an acknowledgement signal determining circuit 19 is connected to the first sample-and-hold circuit 18. Supplied with the clock pulses CLK, the acknowledgement signal determining circuit 19 generates the acknowledgement signal 17 in accordance with the level of the first held signal. The acknowledgement signal determining circuit 19 determines the level of the first held signal in response to a trailing edge of one of the clock pulses CLK. When the first held signal is at the request level (namely, the logic "0" level) at a trailing edge of a specific one of the clock pulses CLK, the acknowledgement signal determining circuit 19 makes a first determination that the first held signal has the request level (namely, the logic "0" level). The acknowledgement signal determining circuit 19 generates an acknowledgement signal 17 having the acknowledged level (namely, the logic "0" level) in response to a leading edge of one of the clock pulses CLK that immediately follows the specific one of the clock pulses CLK. The first determination of the acknowledgment signal determining circuit 19 is depicted along a fifth line in FIG. 2.

In FIG. 1, an end signal producer 20 is connected to the first sample-and-hold circuit 18. Supplied with clock pulses CLK, the end signal producer 20 produces an end signal representative of an end of the direct transfer of data in response to a leading edge of a clock pulse CLK that corresponds to the first held signal which changes to the nonrequest level (namely, the logic "1"

level). The end signal is depicted along a sixth or bottom line in FIG. 2.

The acknowledgment signal determining circuit 19 is also connected to the end signal producer 20. When the acknowledgment signal determining circuit 19 receives the end signal from the end signal producer 20, the acknowledgment signal determining circuit 19 makes a second determination in response to a leading edge of a different one of the clock pulses CLK that is generated immediately after the end signal. When the first held signal has the non-request level (namely, the logic "1" level), the acknowledgment signal determining circuit 19 generates an acknowledgment signal having a nonacknowledged level (namely, the logic "1"). The second determination of the acknowledgement signal determining circuit 19 is depicted along the fifth line in FIG. 2.

Reviewing FIGS. 1 and 2, it should now be appreciated that the acknowledgment signal determining circuit 19 serves as a second sample-and-hold circuit connected to the first sample-and-hold circuit 18. As is apparent from FIG. 2, supplied with clock pulses CLK, the second sample-and-hold circuit samples the first held signal into a second sampled signal in synchronism with leading edges of the clock pulses CLK and holds the second sampled signal as a second held signal which serves as the DMA acknowledgement signal 17.

Suppose in FIGS. 1 and 2 that the peripheral device 12 produces a different DMA request before the first sample-and-hold circuit 18 samples the DMA request signal 16 of the nonrequest level for a preceding DMA request. Then, the first sample-and-hold circuit 18 determines that the peripheral device 12 continuously produces the preceding DMA request although the peripheral device 12 actually produces a DMA request different from the preceding DMA request as described earlier in the instant specification. That is, the DMA request controlling arrangement 10 malfunctions.

Figure 3:
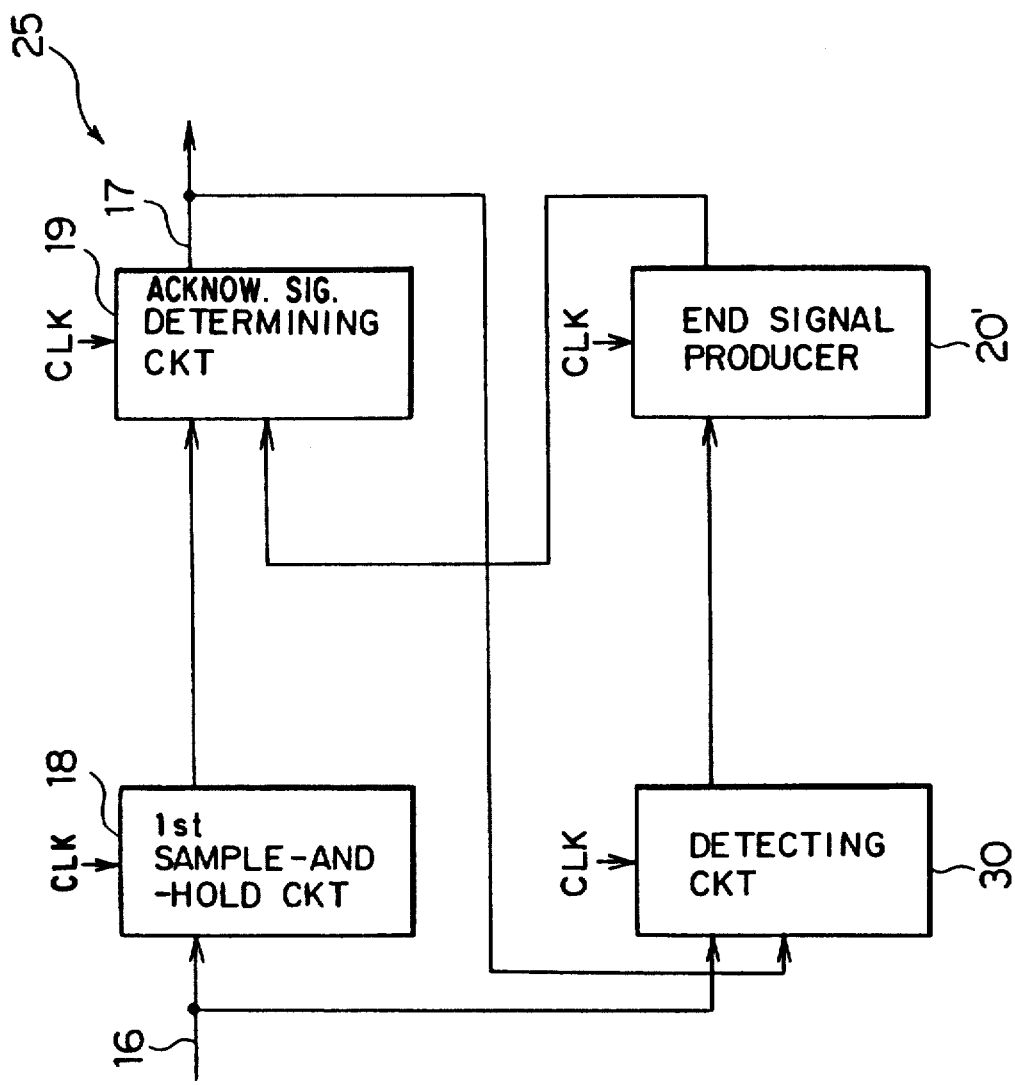
FIG. 3 is a block diagram of a DMA request controlling arrangement according to an embodiment of this invention.
Figure 4:
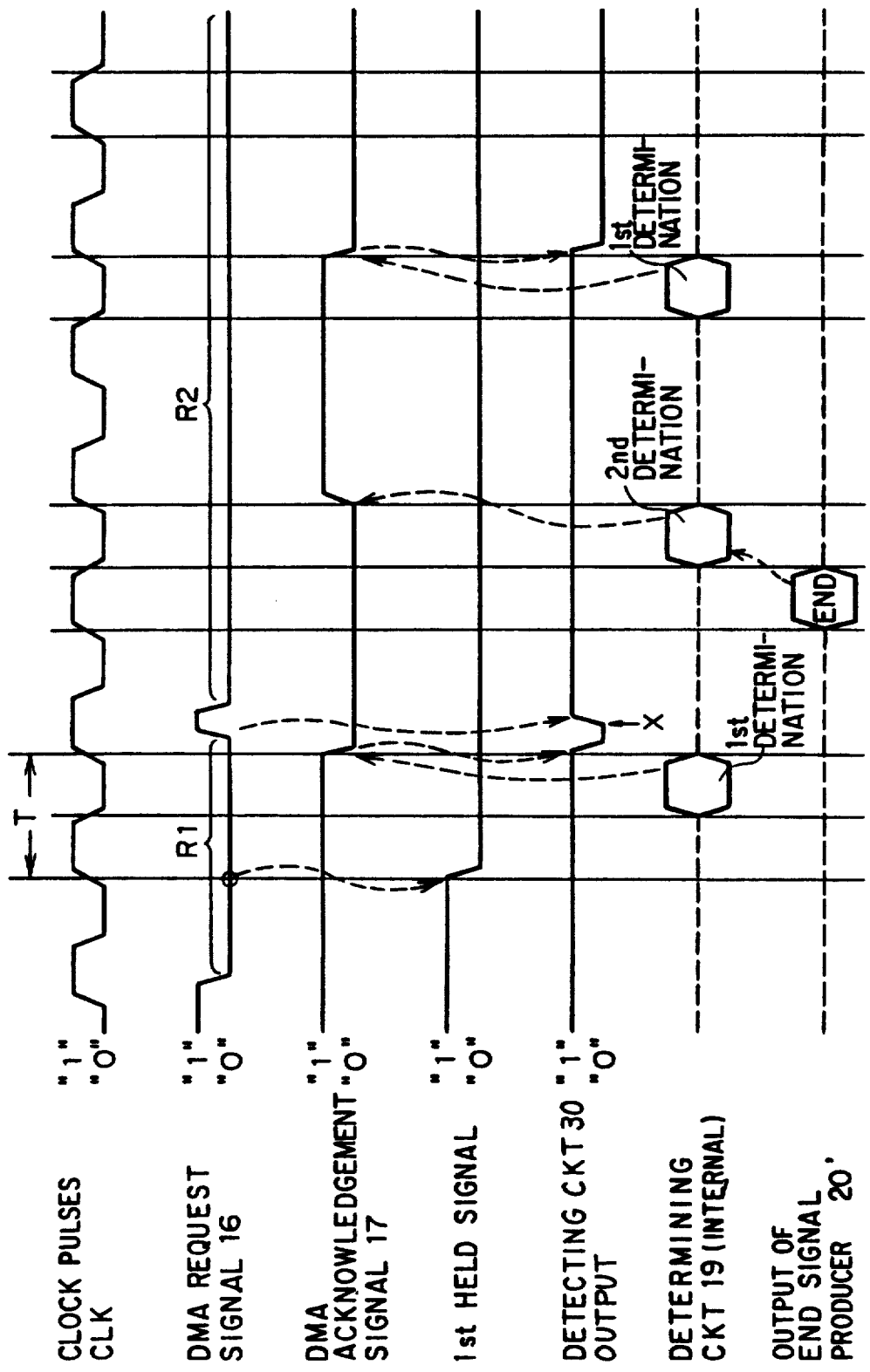
FIG. 4 is a time chart for use in describing operation of the DMA request controlling arrangement illustrated in FIG. 3.

Turning to FIGS. 3 and 4, a DMA controlling arrangement 25 according to a preferred embodiment of this invention is similar to the DMA controlling arrangement 10 except for the following. The DMA controlling arrangement 25 further comprises a detecting circuit 30 connected to the acknowledgment signal determining circuit 19. Supplied with the DMA request signal 16, the detecting circuit 30 detects a time instant at which the DMA request signal 16 changes to the nonrequest level after the DMA acknowledgement signal 17 changes to the acknowledged level and thereby produces a detection signal. The time instant when the detecting circuit 30 generates the detecting signal is shown by an arrow X in the fifth waveform of FIG. 4.

Figure 5:
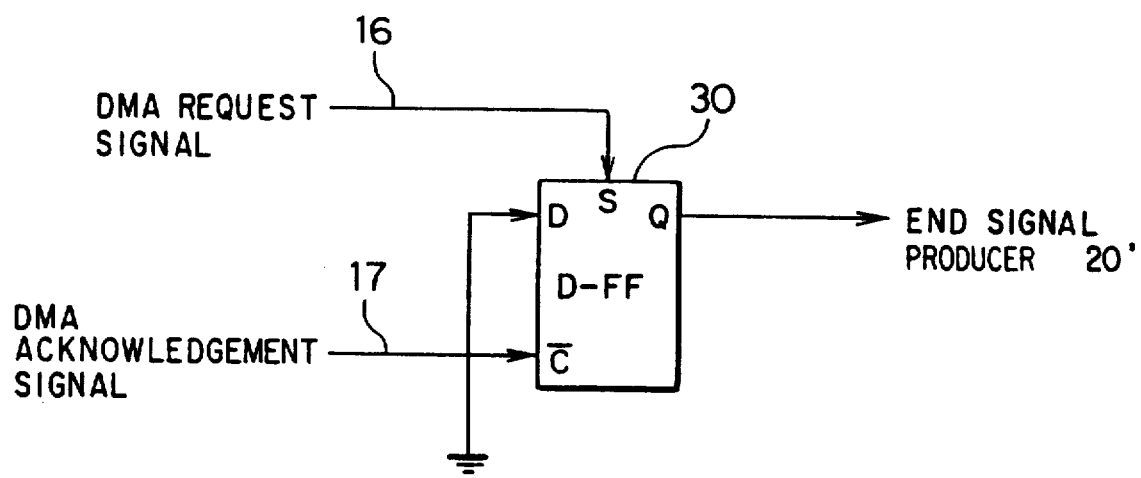
FIG. 5 is a block diagram of a detecting circuit of the DMA request controlling arrangement illustrated in FIG. 3.

In practice, the detecting circuit 30 is constituted by a D-type flip-flop illustrated in FIG. 5. In FIG. 5, the D-type flip-flop 30 has first, second, and third input terminals S, $\overline{C}$, and D and an output terminal Q. The first input terminal S is supplied with the DMA request signal 16. The second or clock input terminal $\overline{C}$ is supplied with the DMA acknowledgement signal 17. The third input terminal D is supplied with a signal having a "0" level (a ground potential, e.g.). The output terminal Q is connected to a modified end signal producer 20' which will later be described.

Only when the first input terminal S is supplied with the DMA request signal 16 of the acknowledged level (namely, the logic "0" level), does the clock terminal $\overline{C}$ becomes valid. When the DMA acknowledgement signal 17 is at the acknowledged level while the DMA request signal 16 is at the acknowledged level, the D-type flip-flop 30 supplies the logic "0" level to the output terminal Q. When the DMA request signal 16 changes to the nonacknowledged level (namely, the logic "1" level), the D-type flip-flop 30 supplies a logic "1" level to the output terminal Q. An output of the detecting circuit 30 is depicted along a fifth line in FIG. 4.

In FIGS. 3 and 4, the (modified) end signal producer 20' is connected to the detecting circuit 30. Supplied with clock pulses CLK, the end signal producer 20' produces an end signal representative of an end of the direct transfer of data in response to one of the clock pulses CLK that is generated immediately after reception of the detection signal produced at the time instant X.

The acknowledgement signal determining circuit (namely, the second sample-and-hold circuit) 19 is furthermore connected to the end signal producer 20' to carry out a second determination. When the acknowledgement signal determining circuit 19 receives the end signal while the first held signal is at the request level (namely, the logic "0" level), the acknowledgment signal determining circuit 19 generates a DMA acknowledgement signal 17 having a nonacknowledged level in response to a different one of the clock pulses CLK that is generated immediately after reception of the end signal.

Thereafter, the acknowledgment signal determining circuit 19 carries out the first determination because the first held signal is at the request level (namely, the logic "0" level). In this event, the acknowledgment signal determining circuit 19 generates a acknowledgement signal having an acknowledged level (namely, the logic "0" level) in response to a leading edge of a following clock pulse. In this case, the acknowledgment signal determining circuit 19 recognizes that a different DMA request is generated after generation of a preceding DMA request.

Attention will be directed to immediately successive first and second DMA requests R1 and R2 depicted along the second line in FIG. 4. The second DMA request R2 is produced before the first sample-and-hold circuit 18 samples the DMA request signal 16 of the nonrequest level for the first or preceding DMA request R1. In this case, the DMA request controlling arrangement 25 does not malfunction because the acknowledgment signal determining circuit 19 cooperates both with the detecting circuit 30 and the end signal producer 20' in the above-mentioned manner.

What is claimed is:

1. A direct memory access (DMA) request controlling arrangement in a DMA controller which controls direct transfer of data between a peripheral device and a memory in synchronism with a sequence of clock pulses of a common clock pulse period, said peripheral device comprising a DMA request signal producing means for producing a DMA request signal which has request and nonrequest levels representing generation and nongeneration of a DMA request, respectively, said DMA request controlling arrangement for controlling said DMA request signal to produce a DMA acknowledgment signal and to deliver said DMA acknowledgment signal to said peripheral device, said DMA acknowledgement signal having acknowledged and nonacknowledged levels representing generation and nongeneration of a DMA acknowledgement for said DMA request, respectively, said DMA request controlling arrangement comprising:

first sample-and-hold means supplied with said DMA request signal and with said sequence of clock pulses for sampling said DMA request signal into a first sampled signal in synchronism with said sequence of clock pulses and for holding said first sampled signal as a first held signal;

second sample-and-hold means connected to said first sample-and-hold means and supplied with said sequence of clock pulses for sampling said first held signal into a second sampled signal in synchronism with said sequence of clock pulses and for holding said second sampled signal as a second held signal which serves as said DMA acknowledgment signal;

detecting means supplied with said DMA acknowledgment signal from said second sample-and-hold means and with said DMA request signal for detecting a time instant at which said DMA request signal attains said nonrequest level after said DMA acknowledgment signal attains said acknowledged level, and for thereby producing a detection signal; and end signal producing means supplied with said detection DMA signal from said detecting means and with said sequence of clock pulses for producing an end signal representative of an end of said direct transfer of data in response to one of said clock pulses that is generated immediately after reception of said detection signal;

said second sample-and-hold means also being connected to said end signal producing means to make said DMA acknowledgment signal have said nonacknowledged level in response to a different one of said clock pulses that is generated immediately after reception of said end signal.

* * * * *

UNITED STATES PATENT AND TRADEMARK OFFICE
CERTIFICATE OF CORRECTION

PATENT NO. : 5,253,356

DATED : Oct. 12, 1993

INVENTOR(S) : Makoto YAMADATE et al.

It is certified that error appears in the above-identified patent and that said Letters Patent is hereby corrected as shown below:

Col. 8, line 7, delete "DMA".

Signed and Sealed this

Fourteenth Day of June, 1994

*Attest:*

BRUCE LEHMAN

*Attesting Officer*    *Commissioner of Patents and Trademarks*